United States Patent
Ruffini et al.

(10) Patent No.: US 10,161,022 B2
(45) Date of Patent: Dec. 25, 2018

(54) TUBULAR SOLAR COLLECTORS

(75) Inventors: Federico Ruffini, Terni (IT); Claudio Raggi, Terni (IT); Stefano Fortunati, Sangemini (IT); Learco Cagiola, Torgiano (IT); Antonio De Luca, Rome (IT)

(73) Assignee: ARCHIMEDE SOLAR ENERGY SRL, Massa Martana (PG) (IT)

( * ) Notice: Subject to any disclaimer, the term of this patent is extended or adjusted under 35 U.S.C. 154(b) by 793 days.

(21) Appl. No.: 13/642,019

(22) PCT Filed: Apr. 11, 2011

(86) PCT No.: PCT/IB2011/051541
§ 371 (c)(1),
(2), (4) Date: Oct. 18, 2012

(87) PCT Pub. No.: WO2011/132107
PCT Pub. Date: Oct. 27, 2011

(65) Prior Publication Data
US 2013/0032137 A1    Feb. 7, 2013

(30) Foreign Application Priority Data

Apr. 19, 2010  (IT) .............................. MI2010A0659

(51) Int. Cl.
*C22C 38/02* (2006.01)
*C22C 38/10* (2006.01)
(Continued)

(52) U.S. Cl.
CPC .......... *C22C 38/105* (2013.01); *C03C 27/046* (2013.01); *F24S 10/45* (2018.05);
(Continued)

(58) Field of Classification Search
None
See application file for complete search history.

(56) References Cited

U.S. PATENT DOCUMENTS 2,564,950 A    1/1947   Black
2,859,562 A    11/1958  Dorgelo et al.
(Continued)

FOREIGN PATENT DOCUMENTS

CN    101117276 A      2/2008
DE    202005014828 U1  12/2005
(Continued)

OTHER PUBLICATIONS

Matsumiya et al., "Determination of trace impurities in high-purity iron using salting-out of polyoxyethylene-type surfactants" Analytica Chimica Acta vol. 653, Issue 1, Oct. 19, 2009, pp. 86-90.*
(Continued)

*Primary Examiner* — Christopher S Kessler
(74) *Attorney, Agent, or Firm* — Lucas & Mercanti, LLP

(57) ABSTRACT

A metal composition suitable for originating a joint by means of welding with a borosilicate glass for a solar collector. The composition, expressed in weight percentage, comprises the following alloy elements:

Figure 3:
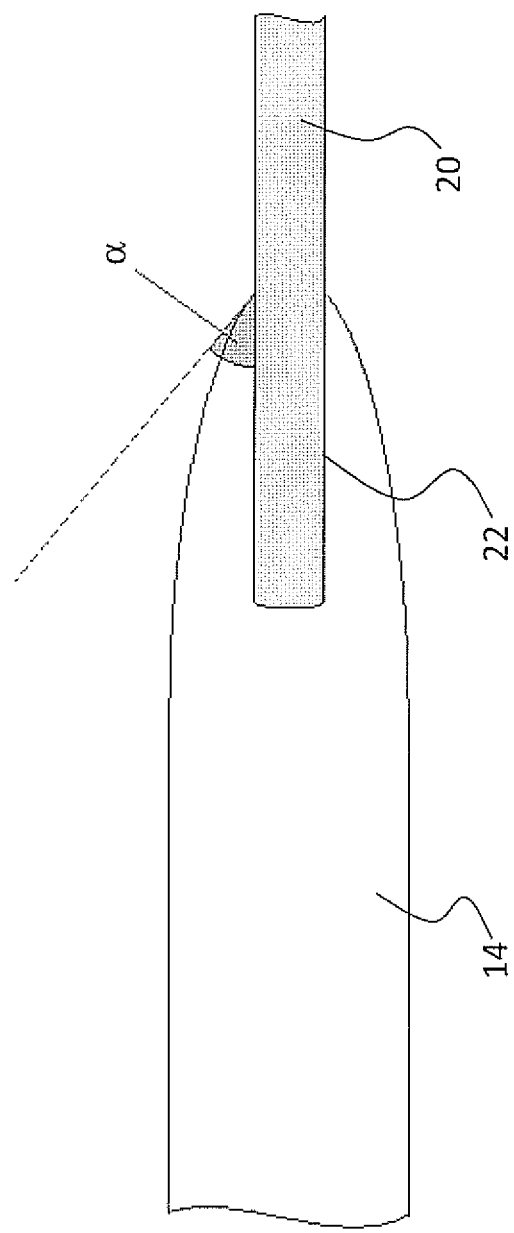

| Ni | Co | Mn | Si | C | Ti | Zr | Ta | Ti + Zr + Ta |
|---|---|---|---|---|---|---|---|---|
| 28-31 | 15-18 | ≤0.5 | ≤0.3 | ≤0.05 | ≤0.30 | ≤0.30 | ≤0.30 | ≤0.40 | and it is such that 45.5≤(Ni+Co)≤46.5, and that (Ti+Ta+Zr) ≥4×C, the remaining part being made up of iron, apart from the inevitable impurities. Additionally, a metal ring made of the metal composition described above and suitable for originating a metal-glass joint by means of welding; the metal-glass joint thus obtained; and the tubular solar collector thus obtained.

7 Claims, 2 Drawing Sheets

(51) Int. Cl.
  *C03C 27/04* (2006.01)
  *F24S 10/40* (2018.01)
  *F24S 25/60* (2018.01)
  *F24S 80/00* (2018.01)

(52) U.S. Cl.
  CPC .... *F24S 2025/6013* (2018.05); *F24S 2080/01* (2018.05); *Y02E 10/44* (2013.01); *Y10T 403/477* (2015.01); *Y10T 428/12361* (2015.01)

(56) References Cited

U.S. PATENT DOCUMENTS

| | | | |
|---|---|---|---|
| 4,286,743 | A | 9/1981 | Vasseur et al. |
| 4,523,578 | A | 6/1985 | Mahdjuri Sabet |
| 6,324,870 | B1 | 12/2001 | Chabin et al. |
| 7,562,655 | B2 | 7/2009 | Kuckelkorn et al. |
| 2005/0181925 | A1 | 8/2005 | Kuckelkorn et al. |
| 2009/0325349 | A1* | 12/2009 | Hashimoto ............ 438/127 |
| 2011/0146776 | A1* | 6/2011 | Carroll et al. ............ 136/256 |

FOREIGN PATENT DOCUMENTS

| | | |
|---|---|---|
| GB | 2103350 A | 2/1983 |
| NL | 7810656 A | 4/1979 |
| WO | 2007033630 A1 | 3/2007 |

OTHER PUBLICATIONS

Yamada et al., "Simultaneous Determination of µg g-1 Levels of Impurities in High Purity Iron by Inductively Coupled Plasma-Atomic Emission Spectrometry after Circulation of Eluant through Anion Exchange Resin Mini-Column" Analytical Sciences vol. 9 (1993) No. 3 p. 385-390.*

PCT International Search Report dated Apr. 26, 2012 for PCT/IB2011/05154, from which the instant application is based (4 pgs.)
Italian Search Report and Opinion dated Feb. 2, 2011 for IT MI2010000659, from which the instant application is based (7 pgs.).

* cited by examiner

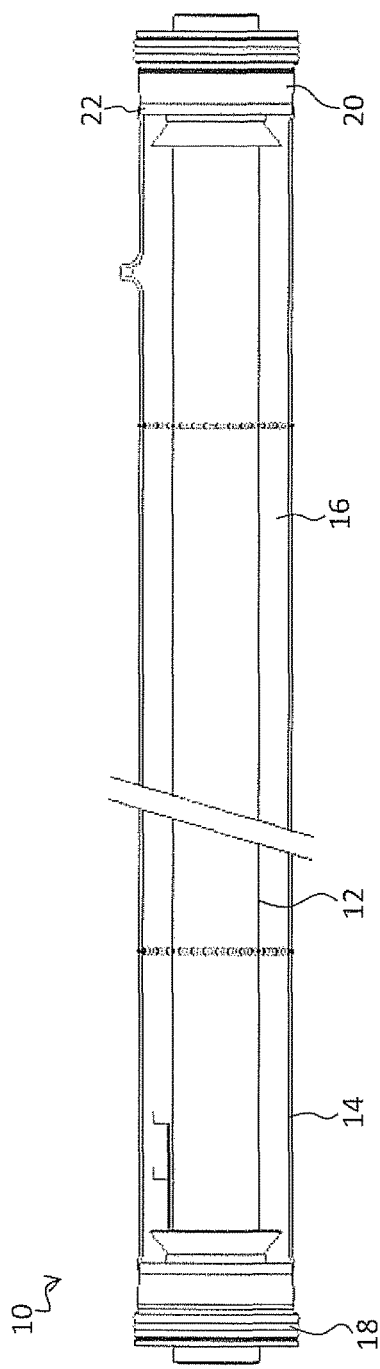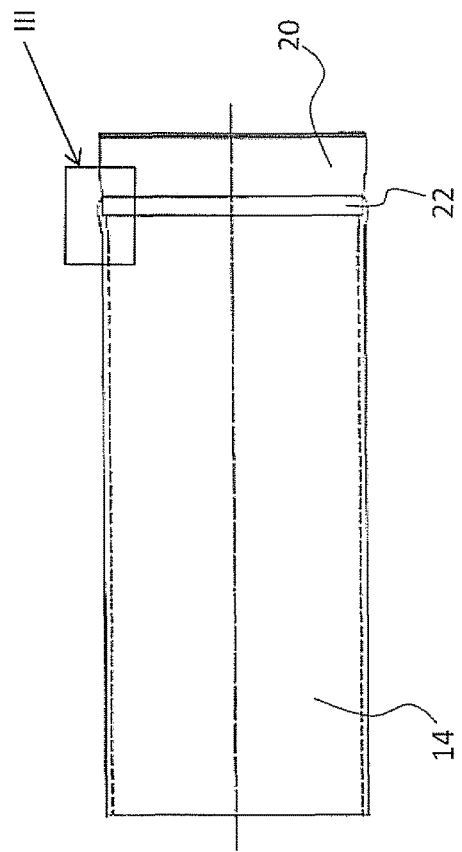

TUBULAR SOLAR COLLECTORS

RELATED APPLICATIONS

This application is a 35 U.S.C. 371 national stage filing from International Application No. PCT/IB2011/051541 filed Apr. 11, 2011 and claims priority to Italian Application No. MI2010A000659 filed Apr. 19, 2010, the teachings of which are incorporated herein by reference.

FIELD OF THE INVENTION

The present invention refers to the field of tubular solar collectors, suitable for operating under vacuum and for using different heat carrier fluids, comprising a metal-glass joint connection.

The proposed invention can be used in the production of linear concentrating solar collectors in which a vacuum gap is provided between an inner receiver metal tube and an outer glass tube, and where the receiver tube is connected to the outer tube by means of a connection element such to guarantee maintenance of the vacuum in the gap.

STATE OF THE ART

As known, in the sector of electrical energy production exploiting the concentration of solar energy, and in particular in the new thermodynamic plants, special parabolic mirrors are used which rotate around only one axis tracking the sun in the east-west trajectory thereof. The mirrors reflect and concentrate solely the direct component of the solar radiation on a receiver tube or collector within which a suitable heat carrier fluid flows such as diathermic oil or mixtures of molten salts or vapour. The fluid, after having gone through a series of solar collectors, heats up to a temperature of about 600-700° C., and the heat thus absorbed is transferred, by means of a suitable heat exchanger, to a vapour generator for the subsequent production of electricity through a turbo-alternator. Such collectors are thus subjected to cyclic heating and cooling, caused by the solar cycle, of the heat carrier fluid contained therein. The solar collector is one of the most important elements in the concentrating solar energy plants, and performance thereof strongly influences the heat efficiency of the solar energy station where it is used. Solar collectors amount for about 20% of the total cost of the solar energy station. The reliability of the solar collector is a fundamental requirement given that the failure of the collector causes considerable technical and economic drawbacks, given that the collectors are typically joined to each other in a single closed circuit, and the failure of only one element stops the entire circuit.

The tube collector is substantially constituted by an inner metal tube in which the heat carrier fluid circulates and by an outer coaxial glass tube maintained under vacuum and connected to the inner tube through a metal-glass joint; the construction of the outer tube of the collector typically requires the use of borosilicate glasses with low coefficient of thermal dilation.

The metal-glass joint is the most critical component of the collector since it has to guarantee an excellent airtight sealing against permeation of gas, resistance against thermal cycling and against corrosion during operation, and it should also be suitably elastic to resist the stresses due to the depressurization of the inner gap.

In order to reliably guarantee such properties for a suitable period of use of the solar collector, the metal-glass joint should have some characteristics regarding the coefficient of thermal expansion and the wettability between metal and glass.

One of the problems related to constructing metal-glass joints, known to those skilled in the art, lies in the fact that metals generally have a coefficient of thermal dilation considerable greater than those typical of borosilicate glasses and this leads to the establishment, in the constructed joint, of mechanical stresses which can easily lead, during thermal excursions to which the joint is subjected both in the step of manufacturing and using the collector, to breaking the joint, hence making the joint unreliable and jeopardizing the proper operation of the line of solar collectors.

Metals with different coefficient of thermal dilation have been proposed and used, for the metal-glass joint, but most of them lead to unreliable joints.

A first example of such joint is described in the U.S. Pat. No. 4,523,578, regarding a solar radiation collector, in which the metal of the joint can be copper or stainless steel.

A second example of a joint is described in the U.S. Pat. No. 6,324,870, regarding a connection device used in X-ray tubes, in which the metal of the joint can be stainless steel.

Due to the inherent criticality of the abovementioned joints for industrial applications, there also arises the need of adopting—for manufacturing thereof—technical and geometrical solutions that are difficult to obtain which make the joining process long and complex and imply considerable increase of costs of the finished products.

In order to solve the problem of mechanical stresses in the joint, metal-glass joints were thus proposed with metals or alloys having a coefficient of thermal dilation very close to that of the glass used, such as borosilicate glass, in the temperature range comprised between ambient temperature and the glass annealing one; beyond such temperature, possible differences between the coefficients of thermal expansion of the glass and of the metal are compensated by the fact that the glass, reaching low viscosity, does not offer mechanical resistance and it is thus capable of following the dilation of the metal. These metal-glass joints have low inner stresses after manufacturing and during operation; among metals and metal alloys suitable for the purpose and applied to the manufacturing of metal-glass joints tungsten, molybdenum, the less costly Iron-Nickel (Fe—Ni) alloys and, in particular, the Iron-Nickel-Cobalt (Fe—Ni—Co) alloys were proposed. Among the latter, those that typically contain 29% in weight of nickel and 17% in weight of Cobalt have a transition temperature equivalent to about 430° C., higher than that of Fe—Ni alloys, within which the coefficient of thermal dilation remains almost stable and close to that of borosilicate glass.

A first example of joints of this type is indicated in the U.S. Pat. No. 2,564,950, which discloses a glass for providing glass-metal connections particularly suitable for providing X-ray tubes. The glass has a coefficient of thermal expansion close to that of the Fe—Ni—Co alloys and of tungsten in the operating temperature range of the X-ray tubes.

A second example of a joint of this type is indicated in the U.S. Pat. No. 7,562,655, regarding glass-metal joints applied in solar collectors, in which the metal of the joint is a Fe—Ni—Co alloy and it is directly fused to a borosilicate glass.

However, both U.S. Pat. No. 2,564,950 and U.S. Pat. No. 7,562,655, are not seem to offer a valid solution for problems related to adhesion and anchoring, thermal cycling and corrosion during operation.

Furthermore, in order to guarantee airtight sealing, the metal and the glass must have good wettability with respect to each other. Such properly can be evaluated by measuring the contact angle α between the metal and the glass which is formed in the joining step. Such angle α is comprised between the direction of the metal-glass tension and the direction of the glass-air tension, tangent to the outer surface of the glass, with the vertex in the glass-metal-air three-phase point. A contact angle α lesser than 90° is an index of good wettability, an angle α greater than 90° is instead an index of poor wettability.

The considerable current problems and criticalities of industrial construction and application are due to the fact that the metal and the glass are not formed by single elements but by a combination of elements and chemical compounds, and which require—for coupling thereof—identifying a specific metal alloy and a specific glass mixture capable of meeting the technological requirements, and a suitable thermal treatment with development of specific oxides on the surface of the base metal.

The state of the art provides for that the metal, such as the Fe—Ni—Co alloys, be subjected, before being joined to the glass, to decarburization treatment in high temperature wet hydrogen.

Decarburization aims at eliminating carbon from the metal matrix, so as to prevent the latter from reacting with the oxides of the glass forming CO and/or $CO_2$ bubbles which jeopardize the resistance of the joint. However, the decarburization treatment reveals the drawback of requiring particular safety measures due to the use of hydrogen in high concentrations, thus representing an expensive and complex step of the process of providing the joint.

A method for avoiding decarburization of Fe—Ni—Co alloys before joining to the glass, is indicated in CN101117276, which describes a process for assembling glass and metal, and a subsequent treatment of the assembled component consisting in oxidation in wet nitrogen at 450-700° C. for 1-50 minutes, heating with a gradient of 5-15° C./min, maintaining in a mildly reducing environment containing hydrogen at 900-1050° C. for 5-60 minutes, and final cooling at 250-200° C. with a descent gradient of 5-15° C./min. Such process is extremely complex and requires a strict control of the temperature and the atmosphere of the process, and it is thus difficult to apply to automated large scale production of metal-glass joints for use in concentrating solar collectors. Such document however is lacking in the identification of an ideal metal composition to be coupled to a glass composition.

It is thus observable that, according to the state of the art, a resistant and reliable joint between tubular elements made of borosilicate glass and metal, even using an alloy (for example Fe—Ni—Co) with a coefficient of thermal dilation close to that of glass, cannot be obtained in a manner such to allow avoiding the critical phase of decarburization prior to welding or joining, or however the introduction of complex thermal joining processes causing negative impacts on the reliability of the metal-glass joint product. The present invention proposes a tubular solar collector obtained using an innovative metal-glass joint having a specific metal alloy composition and a specific glass composition, such to overcome the problems known from the prior art.

The use of the new metal alloy allows obtaining metal-glass joints through simple operating conditions, adapted to be obtained at industrial level through automatic systems.

Furthermore, coupling the metal with a glass having innovative composition and chemical-physical characteristics, metal-glass tubular joints are provided with improved characteristics of adherence between the two materials and an excellent stability in presence of strong values of vacuum, thermal cycling and exposure to corrosive agents. The main advantages that can be achieved by providing the solar collector with the proposed metal-glass joint according to the present invention are: an excellent airtight sealing against permeation of gas, a suitable elasticity such to resist the stresses due to depressurization of the inner gap, a high resistance to thermal cycling and to corrosion during operation.

BRIEF SUMMARY OF EMBODIMENTS OF THE INVENTION

A main object of the present invention is a metal composition suitable for originating a joint by means of welding with a borosilicate glass for a solar collector. The composition, expressed in weight percentage, comprises the following alloy elements:

| Ni | Co | Mn | Si | C | Ti | Zr | Ta | Ti + Zr + Ta |
|---|---|---|---|---|---|---|---|---|
| 28-31 | 15-18 | ≤0.5 | ≤0.3 | ≤0.05 | ≤0.30 | ≤0.30 | ≤0.30 | ≤0.40 | and such that $$45.5 \leq (Ni+Co) \leq 46.5$$

$$(Ti+Ta+Zr) \geq 4 \times C$$

the remaining part being made up of iron (Fe) apart from the inevitable impurities. Another object of the invention is a metal composition according to what has been described above, in particular comprising the following alloy elements:

| Ni | Co | Mn | Si | C | Ti | Zr | Ta | Ti + Zr + Ta |
|---|---|---|---|---|---|---|---|---|
| 29-30 | 16-17 | ≤0.3 | ≤0.2 | ≤0.03 | ≤0.30 | ≤0.30 | ≤0.30 | ≤0.40 | and such that:

$$45.5 \leq (Ni+Co) \leq 46.5 \text{ and}$$

$$(Ti+Ta+Zr) \geq 6 \times C$$

the remaining part being made up of iron (Fe) apart from the inevitable impurities. Another object of the invention is a metal-glass joint obtained by means of welding for providing a solar collector, in which the metal composition is according to what has been described above and in which the glass is a borosilicate.

Another object of the invention is a joint according to what has been described above, in which the glass composition in particular comprises the following components expressed in weight percentage:

| B$_2$O$_3$ | Al$_2$O$_3$ | Na$_2$O | K$_2$O | CaO | Fe |
|---|---|---|---|---|---|
| 11.8-13.7 | 5-7.5 | 5-8 | 0.1-3 | 0.1-1.5 | <500 ppm | the remaining part being silicon (SiO$_2$) apart from the inevitable impurities.

Another object of the invention is a joint according to what has been described above, in which the glass composition in particular comprises the following components expressed in weight percentage:

| B$_2$O$_3$ | Al$_2$O$_3$ | Na$_2$O | K$_2$O | Fe | TiO$_2$ | ZrO$_2$ | Ta$_2$O$_5$ | CeO$_2$ | Ba |
|---|---|---|---|---|---|---|---|---|---|
| 8-12 | 5-9 | 5-9 | 0-5 | <400 ppm | 1-5 | 0.5-1.5 | 0.5-1.5 | 0.5-1.5 | 0.5-2 | the remaining part being silicon (SiO$_2$) apart from the inevitable impurities.

Another object of the invention is a joint according to what has been described above, in which the composition of the borosilicate glass suitable to obtain the metal-glass joint further comprises CaO in 0.3-2.0 weight percentage.

Another object of the invention is a joint according to what has been described above, in which the composition of the borosilicate glass in particular comprises the following components expressed in weight percentage:

| B$_2$O$_3$ | Al$_2$O$_3$ | Na$_2$O | K$_2$O | CaO | Fe | TiO$_2$ | ZrO$_2$ | Ta$_2$O$_5$ | CeO$_2$ | Ba |
|---|---|---|---|---|---|---|---|---|---|---|
| 9-11 | 6-8 | 6-8 | 1-3 | 0.5-1.5 | <300 ppm | 2-3 | 0.7-1.1 | 0.8-1.2 | 0.7-1.1 | 0.5-1.0 | the remaining part being silicon (SiO$_2$) apart from the inevitable impurities.

Another object of the invention is a metal ring suitable for originating a metal-glass joint by means of welding with a tube made of borosilicate glass for a solar collector, in which the composition of the metal of the ring is according to what has been described above.

Another object of the invention is a tubular solar collector, comprising a first inner metal tube in which a heat carrier fluid circulates, a second outer coaxial tube made of glass suitable to operate under vacuum and connected to the first tube through at least one metal-glass joint, in which:
  the glass of the joint is a borosilicate,
  the first tube is made of metal material resistant to the mechanical and chemical action of a high temperature heat carrier fluid; characterised in that
  the glass of the joint is coupled by direct fusion to a ring according to what has been described above.

Another object of the invention a collector according to what has been described above, in which the metal-glass joint is according to any one of the joints described above. Another object of the invention a collector according to what has been described above, in which the metal of the first tube resistant to the mechanical and chemical action of a high temperature heat carrier fluid is austenitic stainless steel, preferably AISI 321 or 316Ti.

BRIEF DESCRIPTIONS OF THE DRAWINGS

Further characteristics and advantages of the invention will be clear from the description, provided hereinafter, of some embodiments, solely provided by way of non-limiting example with reference to the attached drawings, wherein:
  FIG. 1 represents a tubular solar collector in its entirety;
  FIG. 2 represents a detail of the joint between the glass tube and the metal ring of the tubular solar collector of FIG. 1;
  FIG. 3 represents, in cross-section, the detail indicated with III in FIG. 2 in which the angle α is comprised between the direction of the metal-glass tension and the direction of the glass-air tension, tangent to the outer surface of the glass, with the vertex in the glass-metal-air three-phase point; α represents the contact angle between the metal and the glass which is formed in the joining step.

DETAILED DESCRIPTION OF EMBODIMENTS OF THE INVENTION

The tubular solar collector is indicated in its entirety with it 10. It comprises a first metal inner tube 12 and a second external coaxial tube 14 made of glass. The first tube 12 and the second tube 14 are connected to each other at the ends so as to form a gap 16 adapted to maintain a vacuum condition therewithin.

As observable in FIG. 1, two bellows 18 are arranged at the ends of collector 10, adapted to compensate the differences between the dilation of the first inner tube 12 and that of the second outer tube 14. A tubular component 20 according to the invention, connected to each bellow 18, is then welded to the end of the glass outer tube 14, obtaining the joint 22 according to the invention.

The tubular component 20 can assume the form of a ring, a collar, a sleeve or the like. In the description hereinafter, the term ring is used to refer to such tubular element.

The metal ring 20 of the joint of the proposed collector 10 is obtained using an alloy having an average coefficient of thermal dilation in the range between 25° C. and 450° C. comprised between $4.5 \times 10^{-6}$ and $5.5 \times 10^{-6}$ K$^{-1}$.

The authors of the present invention observed that in order to manufacture the abovementioned collectors 10 with excellent characteristics of vacuum sealing reliability in the gap 16, the alloy should contain titanium, in case combined with tantalum and zirconium, within the indicated limits. The presence of such elements in the indicated concentrations avoids that during the physical coupling between the metal rings 20 and the glass 14 at high temperature to obtain the joint 22, there occurs a localized emission of CO and/or $CO_2$ in the interface zone between the surfaces of the metal and glass. As mentioned previously, the formation of gas bubbles, even extremely small, on the interface between metal and glass, represents a deleterious condition for the mechanical stability of the joint 22 and for the vacuum sealing stability. Thus, the use of the claimed metal alloy allows avoiding the step of decarburization in hydrogen of the metal alloy prior to joining with the borosilicate glasses, since the carbon present in matrix combines in form of titanium, tantalum and zirconium carbides, having a fine dispersion in matrix and a high stability at temperatures exceeding 1000° C.

Thus, the free carbon in matrix is drastically reduced by titanium, tantalum and zirconium possibly present; during the step of joining to the glass, carbon is thus not released by the metal alloy for the formation of CO and/or $CO_2$ in form of bubbles.

The authors of the present invention observed that, advantageously, titanium and tantalum or zirconium possibly present, exceeding the stoichiometric ratio with carbon. i.e. not combined with the carbon of the matrix, selectively bond with oxygen in proximity of the surface layers of the metal, when the metal ring 20 is heated exceeding 750° C. during the joining procedure and during possible thermal treatments prior to the welding operation. The specific oxides identified according to the present invention, based on titanium and/or zirconium and/or tantalum, chemically interact with the glass to which the metal is coupled generating stable bond bridges between the metal and glass surfaces.

The described chemical reactions occur during the step of forming the joint in the 500-1000° C. temperature range, for 1-60 minutes, in the local softening and fusion processes which occur at the interface between the metal and the glass.

The specific layer of oxide which titanium and/or tantalum and/or zirconium contribute to form, is adherent and rooted both to the matrix of the metal alloy, and to the (glass with which it forms specific oxides and compounds such as boron, aluminium, calcium, barium titanate, thus conferring to the metal-glass bond high affinity and thermo-mechanical resistance.

The presence of nickel and cobalt in the amounts indicated in the present invention allows obtaining an alloy with a coefficient of thermal expansion close to that of borosilicate glasses in the temperature range comprised between the ambient temperature and the glass annealing temperature.

The presence of titanium, and in case of tantalum and zirconium, at the amounts indicated in the present invention, eliminates the need for the step of hydrogen decarburization of the metal alloy prior to joining with the glass, and improves the mechanical resistance properties of the metal and affinity to the glass.

The presence of silicon and manganese, at the amounts indicated in the present invention, confers to the metal alloy a good formability, necessary considering the particular geometries of the products to be obtained.

The entirety of the indicated properties thus makes the metal alloy subject of the present invention particularly suitable for making components having even complex geometry intended for metal-glass joints, easily weldable to borosilicate glasses in an automated manner and without requiring a hydrogen decarburization step prior to welding, or however avoiding complex joining processes.

The concentration of the alloy elements and purpose thereof are illustrated hereinafter. Nickel is an austenitizing element and it guarantees—in high concentrations in iron—the reduction of the coefficient of thermal expansion with respect to pure iron.

Cobalt is an austenitizing element and it extends—in high concentrations in the iron—nickel alloys—the temperature range within which the coefficient of thermal expansion remains stable.

In order to guarantee complete stability of the austenitic phase, and a coefficient of thermal expansion close to that of borosilicate glasses, stable up to a temperature of 450° C., the overall amount of nickel and cobalt should be comprised between 45.5% and 46.5%, nickel being present at the range between 28 and 31% in weight and cobalt at the range between 15 and 18% in weight.

Manganese is an austenitizing element and it also inhibits the fragilization behaviour of sulphur, but at a higher amount it has a hardening effect for solid solution, hence content thereof should be limited to 0.5% in weight.

Silicon is present as a deoxidizing agent but at high amounts it causes excessive hardening of the alloy and determines insufficient formability, hence the content thereof should be limited to 0.3% in weight.

Carbon is an element inevitably present in solution in iron and in the Fe—Ni—Co alloys. For obtaining metal-glass joints, it should be present at amounts close to zero in order avoid the formation CO and/or $CO_2$ bubbles; however, its amount cannot be excessively reduced without avoiding the use of particularly pure raw materials and/or expensive refining processes. Thus, the amount of carbon should not exceed 0.05% in weight. Titanium, tantalum and zirconium are particularly important elements of the present invention. Such elements have the main role of combining with carbon to prevent the latter from being free in matrix during the step of joining to the glass. Thus, titanium and/or tantalum and/or zirconium should be present at over-stoichiometric amounts with respect to carbon. The amount of such elements, exceeding carbon, also makes the alloy reactive in the joining phase due to the fact that titanium, zirconium and tantalum oxides chemically interact with the glass. The addition of high amounts of titanium, causes surface flaws of the rolled products, due to the appearance—on the surface—of coarse precipitates and titanium-based aggregates. Furthermore, the addition of high amounts of tantalum and zirconium determines an undesired rising of the recrystalisation temperature and reinforcement of the crystalline structure, to the detriment of formability. Thus, the overall amount of the three elements is limited to below 4 times the amount of carbon with the sum thereof limited to 0.4% in weight; each element, both separately or combined with others, should be present at amounts comprised between 0.15% and 0.30% in weight.

The authors of the present invention also advantageously discovered that borosilicate glass, containing $TiO_2$, $ZrO_2$ and $Ta_2O_5$ within the indicated limits, is particularly suitable for joining with the previously described metal, given that such oxides improve the chemical affinity and wettability of the glass to the metal, in presence of titanium and/or zirconium and/or tantalum oxides on the metal surface. Such condition occurs when the metal ring 20 is heated exceeding 750° C. during the joining procedure and during possible thermal treatments prior to the welding operation.

The glass having the indicated composition, subject of the present invention, is suitable for welding with the previously described Fe—Ni—Co alloy given that it has an average coefficient of thermal dilation in the range between 25° C. and 450° C. equivalent to $5.2 \times 10^{-6}$ K$^{-1}$, and thus generates metal-glass joints with low inner stresses after construction and during operation.

The glass having the indicated composition has an excellent resistance to corrosion of acids and alkaline solutions, a light transmittance in the solar spectrum exceeding 90%, and low costs of manufacture with respect to the family of pharmaceutical borosilicate glasses, given that it is not barium-free. Thus, the glass subject of the present invention is particularly suitable for making reliable and relatively inexpensive tubular collectors 10 for concentrating solar energy.

The present invention has been described generally up to this point. With the help of the following examples, will be given a more detailed description of some specific embodiments thereof, with the aim of better outlining objects, characteristics and advantages.

Example 1

According to the present invention, a metal was provided for a metal-glass joint for a tubular solar collector 10, having the following composition:

| Ni | Co | Mn | Si | C | Ti | Zr | Ta | Ti + Zr + Ta | Ni + Co |
|---|---|---|---|---|---|---|---|---|---|
| 28.8 | 16.8 | 0.38 | 0.22 | 0.048 | 0.26 | <0.01 | <0.01 | 0.26 | 45.6 | the remaining part being made up of iron apart from the inevitable impurities. Such composition meets the conditions:

$$45.5 \leq (Ni+Co) \leq 46.5$$

$$(Ti+Ta+Zr) \geq 4 \times C$$

An assembly of joints between the proposed metal and a borosilicate glass was thus provided after subjecting the metal to an oxidizing process in air at 900° C. for 20 min without prior decarburization in wet hydrogen. The oxidised metal and glass were directly welded by placing them at contact for 15 minutes at the temperature of 800° C., and cooling the joint down to ambient temperature in controlled conditions with a gradient of 1° C./min.

From the assembly of metal-glass joints thus provided, one was subjected to metallographic analysis through cross-sectional observation to verify possible presence of gas bubbles in the glass and measure the contact angle α between metal and glass, and another was subjected to a vacuum tightness test to verify the air-tightness of the joint, through spectrometric measurement of the permeation of helium. In order to verify reliability thereof, another joint was subjected to a series of thermal cycles constituted by heating up to 350° C. and maintaining such temperature for 20 minutes, followed by cooling at ambient temperature for 5 minutes. After 10$^4$ cycles, the joint was subjected to the vacuum sealing test.

The metallographic analysis revealed a structure of the joint free of hubbies in the glass, with a contact angle α between the glass and the metal equal to 55°.

The vacuum sealing test revealed a gas permeation equal to $6.71 \times 10^{-10}$ mbar*l/s. After thermal cycling, the measured vacuum tightness amounted to $9.52 \times 10^{-10}$ mbar*l/s.

Such example proves the advantages obtained by means of the joint of a metal according to the present invention and a borosilicate glass. The joint revealed to be free of flaws caused by the formation of CO and/or CO$_2$ in the glass without requiring the introduction in the process of a metal decarburization step, a satisfactory wettability was also observed of the borosilicate glass with respect to the surface of the metal; the joint thus obtained revealed a vacuum tightness reliable over time, since the values of permeability were lower than the threshold of $1 \times 10^{-9}$ mbar*l/s, deemed critical for the resistance of metal-glass joints. The metal-glass joint 22 thus obtained is therefore suitable for use in concentrating solar collectors 10.

Example 2

According to the present invention, a metal was provided for a metal-glass joint for a tubular solar collector, having the following composition (introduce composition actually used in the example):

| Ni | Co | Mn | Si | C | Ti | Zr | Ta | Ti + Zr + Ta | Ni + Co |
|---|---|---|---|---|---|---|---|---|---|
| 30.6 | 15.3 | 0.43 | 0.27 | 0.036 | <0.01 | 0.19 | 0.17 | 0.36 | 45.9 | the remaining part being made up of iron apart from the inevitable impurities.

Such composition meets the conditions:

$$45.5 \leq (Ni+Co) \leq 46.5$$

$$(Ti+Ta+Zr) \geq 4 \times C.$$

A glass was also provided for a metal-glass joint for a tubular solar collector, having the following composition:

| B$_2$O$_3$ | Al$_2$O$_3$ | Na$_2$O | K$_2$O | CaO | Fe |
|---|---|---|---|---|---|
| 12.3 | 6.8 | 6.8 | 2.5 | 0.5 | 200 ppm | the remaining part being $SiO_2$ apart from the inevitable impurities.

An assembly of joints was thus provided between the proposed metal and glass, after subjecting the metal to an oxidation process in air at 950° C. for 1.0 minutes, without prior decarburization in wet hydrogen. The oxidised metal and glass were directly welded by placing them at contact for 15 minutes at the temperature of 850° C., and cooling the joint down to ambient temperature in controlled conditions with a gradient of 1.5° C./min.

From the assembly of metal-glass joints thus provided, one was subjected to metallographic analysis through cross-sectional observation to verify possible presence of gas bubbles in the glass and measure the contact angle α between metal and glass, and another was subjected to a vacuum tightness test to verify the air-tightness of the joint, through spectrometric measurement of the permeation of helium. In order to verify reliability thereof, another joint was subjected to a series of thermal cycles constituted by heating up to 350° C. and maintaining such temperature for 20 minutes, followed by cooling at ambient temperature for 5 minutes. After $10^4$ cycles, the joint was subjected to the vacuum tightness test.

The metallographic analysis revealed a structure of the joint free of bubbles in the glass, and with a contact angle α between the glass and the metal equal to 48°.

The vacuum tightness test revealed a gas permeation equal to $5.95 \times 10^{-10}$ mbar*l/s. After thermal cycling, the measured vacuum tightness amounted to $8.96 \times 10^{-10}$ mbar*l/s.

Such example proves the advantages obtained by means of a joint of a metal and a glass according to the present invention. Also in this case, the joint revealed to be free of flaws caused by the formation of CO and/or $CO_2$ in the glass, without requiring a metal decarburization step; the borosilicate glass subject of the present invention revealed an optimal wettability with respect to the surface of the metal; the joint thus obtained revealed a vacuum tightness reliable over time, given that the values of permeability were lower than the threshold of $1 \times 10^{-9}$ mbar*l/s, deemed critical for the resistance of metal-glass joints, and better with respect to the values measured for the metal-glass joint of example 1. The metal-glass joint 22 thus obtained is therefore suitable for use in concentrating solar collectors 10.

Example 3

According to the present invention, a metal was provided for a metal-glass joint for a tubular solar collector, having the following composition:

| Ni | Co | Mn | Si | C | Ti | Zr | Ta | Ti + Zr + Ta | Ni + Co |
|---|---|---|---|---|---|---|---|---|---|
| 30.2 | 15.8 | 0.40 | 0.25 | 0.033 | 0.16 | 0.15 | <0.01 | 0.31 | 46.0 | the remaining part being made up of iron apart from the inevitable impurities.

Such composition meets the conditions:

$$45.5 \leq (Ni+Co) \leq 46.5$$

$$(Ti+Ta+Zr) \geq 4 \times C$$

A glass was also provided for a metal-glass joint for a tubular solar collector, essentially consisting of:

| $B_2O_3$ | $Al_2O_3$ | $Na_2O$ | $K_2O$ | Fe | $TiO_2$ | $ZrO_2$ | $Ta_2O_5$ | $CeO_2$ | Ba |
|---|---|---|---|---|---|---|---|---|---|
| 9.8 | 6.2 | 5.9 | 3.8 | 200 ppm | 1.2 | 1.3 | 1.2 | 1.5 | 1.0 | the remaining part being $SiO_2$ apart from the inevitable impurities.

An assembly of joints was thus provided between the proposed metal and glass, after subjecting the metal to an oxidation process in air at 850° C. for 41) minutes without prior decarburization in wet hydrogen. The oxidised metal and glass were directly welded by placing them at contact for 10 minutes at the temperature of 900° C., and cooling the joint down to ambient temperature in controlled conditions with a gradient of 2.5° C./min.

From the assembly of metal-glass joints thus provided, one was subjected to metallographic analysis through cross-sectional observation to verify possible presence of gas bubbles in the glass and measure the contact angle α between metal and glass, and another was subjected to a vacuum tightness test to verify the air-tightness of the joint, through spectrometric measurement of the permeation of helium. In order to verify reliability thereof, another joint was subjected to a series of thermal cycles constituted by heating up to 350° C. and maintaining such temperature for 20 minutes, followed by cooling at ambient temperature for 5 minutes. After $10^4$ cycles, the joint was subjected to the vacuum tightness test.

The metallographic analysis revealed a structure of the joint free of bubbles in the glass, and with a contact angle α between the glass and the metal equal to 35°.

The vacuum tightness test revealed a gas permeation equal to $4.47 \times 10^{-10}$ mbar*l/s. After thermal cycling, the measured vacuum tightness amounted to $7.79 \times 10^{-10}$ mbar*l/s.

Such example proves the advantages obtained by means of the joint of a metal and a glass according to the present invention. Also in this case, the joint revealed to be free of flaws caused by the formation of CO and/or $CO_2$ in the glass, without requiring a metal decarburization step; the borosilicate glass subject of the present invention revealed an optimal wettability with respect to the surface of the metal; the joint thus obtained revealed a vacuum tightness reliable over time, given that the values of permeability were lower than the threshold of $1 \times 10^{-9}$ mbar*l/s, deemed critical for the resistance of metal-glass joints, and better with respect to the values measured for the metal-glass joint of example 1. The metal-glass joint 22 thus obtained is therefore suitable for use in concentrating solar collectors 10.

Example 4

According to the present invention, a metal was provided for a metal-glass joint for a tubular solar collector, having the following composition:

| Ni | Co | Mn | Si | C | Ti | Zr | Ta | Ti + Zr + Ta | Ni + Co |
|---|---|---|---|---|---|---|---|---|---|
| 29.1 | 16.8 | 0.28 | 0.11 | 0.021 | 0.22 | <0.01 | 0.16 | 0.38 | 45.9 | the remaining part being made up of iron apart from the inevitable impurities.

Such composition meets the conditions:

$$45.5 \leq (Ni+Co) \leq 46.5$$

$$(Ti+Ta+Zr) \geq 4 \times C$$

A glass was also provided for a metal-glass joint for a tubular solar collector, essentially consisting of:

| $B_2O_3$ | $Al_2O_3$ | $Na_2O$ | $K_2O$ | CaO | Fe | $TiO_2$ | $ZrO_2$ | $Ta_2O_5$ | $CeO_2$ | Ba |
|---|---|---|---|---|---|---|---|---|---|---|
| 9.2 | 7.3 | 6.7 | 2.8 | 0.5 | 300 ppm | 2.3 | 0.7 | 0.8 | 0.7 | 0.5 | the remaining part being $SiO_2$ apart from the inevitable impurities.

An assembly of joints was then provided between the metal and the glass described previously, after subjecting the metal to an oxidation process in air at 800° C. for 60 minutes, without prior decarburization in wet hydrogen. The oxidised metal and glass were directly welded by placing them at contact for 5 minutes at the temperature of 900° C., and cooling the joint down to ambient temperature in controlled conditions with a gradient of 1.5° C./min.

From the assembly of metal-glass joints thus provided, one was subjected to metallographic analysis through cross-sectional observation to verify possible presence of gas bubbles in the glass and measure the contact angle α between metal and glass, and another was subjected to a vacuum tightness test to verify the air-tightness of the joint, through spectrometric measurement of the permeation of helium. In order to verify reliability thereof, another joint was subjected to a series of thermal cycles constituted by heating up to 350° C. and maintaining such temperature for 20 minutes, followed by cooling at ambient temperature for 5 minutes. After $10^4$ cycles, the joint was subjected to the vacuum tightness test.

The metallographic analysis revealed a structure of the joint free of bubbles in the glass, with a contact angle α between the glass and the metal equal to 26°.

The vacuum sealing test revealed a gas permeation equal to $2.67 \times 10^{-10}$ mbar*l/s. After thermal cycling, the measured vacuum tightness amounted to $3.42 \times 10^{-10}$ mbar*l/s.

Such example further proves the advantages obtained by means of the joint of a metal and a glass according to the present invention. Also in this case the joint revealed to be free of flaws caused by the formation of CO and/or $CO_2$ in the glass, given that the metal decarburization step was avoided and the glass revealed an excellent wettability with respect to the surface of the metal; the joint thus obtained revealed a vacuum tightness particularly marked and reliable over time since the values of permeability were lower than the threshold of $1 \times 10^{-9}$ mbar*l/s deemed critical for the resistance of metal-glass joints, and even lower than the values measured regarding the joints of the previous examples. The metal-glass joint 22 thus obtained is therefore particularly suitable for use in concentrating solar collectors 10.

Example 5

Lastly, a metal was provided for a metal-glass joint for a tubular solar collector, having the following composition:

| Ni | Co | Mn | Si | C | Ti | Zr | Ta | Ti + Zr + Ta | Ni + Co |
|---|---|---|---|---|---|---|---|---|---|
| 28.6 | 17.5 | 0.30 | 0.19 | 0.045 | <0.01 | <0.01 | <0.01 | <0.01 | 46.10 | the remaining part being made up of iron apart from the inevitable impurities. Such composition meets the condition:

$$45.5 \leq (Ni+Co) \leq 46.5$$

but does not meet the condition:

$$4 \times C \leq (Ti+Ta\pm Zr) \leq 0.40$$

An assembly of joints was then provided between the proposed metal and a borosilicate glass, after subjecting the metal to an oxidation process in air at 850° C. for 30 minutes, without prior decarburization in wet hydrogen. The oxidised metal and glass were directly welded by placing them at contact for 10 minutes at the temperature of 850° C., and cooling the joint down to ambient temperature in controlled conditions with a gradient of 1° C./min.

From the assembly of metal-glass joints thus provided, one was subjected to metallographic analysis through cross-sectional observation to verify possible presence of gas bubbles in the glass and measure the contact angle α between metal and glass, and another was subjected to a vacuum tightness test to verify the air-tightness of the joint, through spectrometric measurement of the permeation of helium. In order to verify reliability thereof, another joint was subjected to a series of thermal cycles constituted by heating up to 350° C. and maintaining such temperature for 20 minutes, followed by cooling at ambient temperature for 5 minutes. After $10^4$ cycles, the joint was subjected to the vacuum tightness test.

The metallographic analysis revealed a structure of the joint affected by bubbles in the glass, with a contact angle α between the glass and the metal equal to 70°.

The vacuum tightness test revealed a gas permeation equal to $8.45 \times 10^{-7}$ mbar*l/s. After thermal cycling, the measured vacuum tightness amounted to $6.34 \times 10^{-7}$ mbar*l/s.

Such example proves the fact that a Fe—Ni—Co alloy beyond the limits of the present invention cannot be welded to a borosilicate glass generating reliable joints in absence of a specific composition of metal and glass and a metal decarburization step. The joint revealed flaws caused by the formation of CO and/or $CO_2$ in the glass, given that carbon was free to spread during the step of implementing the joint from the metal matrix in the borosilicate glass, reacting with the oxides of the latter. In absence of titanium, and/or of tantalum and/or of zirconium, the wettability of the borosilicate glass on the surface of the metal revealed to be poor. The joint thus obtained revealed an unreliable vacuum tightness over time, since permeability, even though initially lower than the threshold of $1 \times 10^{-9}$ mbar*l/s, considerably increased due to the thermal cycles up to extremely high and unacceptable values. The metal-glass joint thus obtained is therefore not suitable for use in concentrating solar collectors.

The invention claimed is:

1. A metal-glass joint obtained by means of welding in order to manufacture a solar collector,
wherein the glass is a borosilicate, and
wherein the composition of metal, expressed in weight percentage, comprises following alloy elements:

| Ni | Co | Mn | Si | C | Ti | Zr | Ta | Ti + Zr + Ta |
|---|---|---|---|---|---|---|---|---|
| 28-31 | 15-18 | ≤0.5 | ≤0.3 | ≤0.05 | ≤0.30 | ≤0.30 | ≤0.30 | 0.15-0.40 | and such that
$45.5 \leq (Ni+Co) \leq 46.5$ and
$(Ti+Ta+Zr) \geq 4 \times C$, wherein each of Ti, Zr, and Ta that is present is individually present an amount between 0.15 and 0.30,
with remaining part of the composition being made up of iron (Fe) apart from inevitable impurities.

2. The joint according to claim 1, wherein the composition of the glass comprises following components expressed in weight percentage:

| $B_2O_3$ | $Al_2O_3$ | $Na_2O$ | $K_2O$ | CaO | Fe |
|---|---|---|---|---|---|
| 11.8-13.7 | 5-7.5 | 5-8 | 0.1-3 | 0.1-1.5 | <500 ppm | remaining part of the glass composition being silicon ($SiO_2$) apart from inevitable impurities.

3. The joint according to claim 1, wherein the composition of the glass comprises the following components expressed in weight percentage:

| $B_2O_3$ | $Al_2O_3$ | $Na_2O$ | $K_2O$ | Fe | $TiO_2$ | $ZrO_2$ | $Ta_2O_5$ | $CeO_2$ | Ba |
|---|---|---|---|---|---|---|---|---|---|
| 8-12 | 5-9 | 5-9 | 0-5 | <400 ppm | 1-5 | 0.5-1.5 | 0.5-1.5 | 0.5-1.5 | 0.5-2 | remaining part of the glass composition being silicon ($SiO_2$) apart from inevitable impurities.

4. The joint according to claim 3, wherein the composition of the glass suitable to obtain the metal-glass joint further comprises CaO in 0.3-2.0 weight percentage.

5. The joint according to claim 3, wherein the composition of the borosilicate glass comprises the following components expressed in weight percentage:

| $B_2O_3$ | $Al_2O_3$ | $Na_2O$ | $K_2O$ | CaO | Fe | $TiO_2$ | $ZrO_2$ | $Ta_2O_5$ | $CeO_2$ | Ba |
|---|---|---|---|---|---|---|---|---|---|---|
| 9-11 | 6-8 | 6-8 | 1-3 | 0.5-1.5 | <300 ppm | 2-3 | 0.7-1.1 | 0.8-1.2 | 0.7-1.1 | 0.5-1.0 | the remaining part of the glass composition being silicon ($SiO_2$) apart from the inevitable impurities.

6. The joint according to claim 4, wherein the composition of the borosilicate glass comprises the following components expressed in weight percentage:

| $B_2O_3$ | $Al_2O_3$ | $Na_2O$ | $K_2O$ | CaO | Fe | $TiO_2$ | $ZrO_2$ | $Ta_2O_5$ | $CeO_2$ | Ba |
|---|---|---|---|---|---|---|---|---|---|---|
| 9-11 | 6-8 | 6-8 | 1-3 | 0.5-1.5 | <300 ppm | 2-3 | 0.7-1.1 | 0.8-1.2 | 0.7-1.1 | 0.5-1.0 | the remaining part of the glass composition being silicon ($SiO_2$) apart from the inevitable impurities.

7. The joint according to claim 1,
wherein the following alloy elements, expressed in weight percentage, further comprise:

| Ni | Co | Mn | Si | C | Ti | Zr | Ta | Ti + Zr + Ta |
|---|---|---|---|---|---|---|---|---|
| 29-30 | 16-17 | ≤0.3 | ≤0.2 | ≤0.03 | ≤0.30 | ≤0.30 | ≤0.30 | 0.15-0.40 | and such that:
$45.5 \leq (Ni+Co) \leq 46.5$ and
$(Ti+Ta+Zr) \geq 6 \times C$, wherein each of Ti, Zr, and Ta that is present is individually present an amount between 0.15 and 0.30,
with remaining part of the composition being made up of iron (Fe) apart from inevitable impurities.

* * * * *